(12) United States Patent
Hill

(10) Patent No.: US 6,809,564 B2
(45) Date of Patent: Oct. 26, 2004

(54) CLOCK GENERATOR FOR AN INTEGRATED CIRCUIT WITH A HIGH-SPEED SERIAL INTERFACE

(75) Inventor: John P. Hill, Nederland, CO (US)

(73) Assignee: STMicroelectronics, Inc., Carrollton, TX (US)

( * ) Notice: Subject to any disclaimer, the term of this patent is extended or adjusted under 35 U.S.C. 154(b) by 0 days.

(21) Appl. No.: 10/197,061

(22) Filed: Jul. 17, 2002

(65) Prior Publication Data

US 2004/0012417 A1 Jan. 22, 2004

(51) Int. Cl.$^7$ .................................................. H03L 7/00
(52) U.S. Cl. ...................................... 327/141; 327/162
(58) Field of Search ................................ 327/141, 142, 327/146, 162, 163, 145, 293; 331/1 R, 145; 375/220, 354, 356

(56) References Cited

U.S. PATENT DOCUMENTS

| | | | | |
|---|---|---|---|---|
| 5,008,865 A | * | 4/1991 | Shaffer et al. ................ 368/10 |
| 5,535,432 A | * | 7/1996 | Dent .......................... 455/77 |
| 5,923,287 A | * | 7/1999 | Lennen .................... 342/357.06 |
| 5,982,210 A | * | 11/1999 | Rogers ........................ 327/156 |
| 6,333,940 B1 | * | 12/2001 | Baydar et al. ............... 370/506 |
| 6,343,364 B1 | * | 1/2002 | Leydier et al. .............. 713/500 |
| 6,466,387 B1 | * | 10/2002 | Ogasawara et al. ........... 360/48 |
| 2002/0103618 A1 | * | 8/2002 | Schleifer et al. ............ 702/176 |

\* cited by examiner

Primary Examiner—Linh M. Nguyen
(74) Attorney, Agent, or Firm—Lisa K. Jorgenson; William J. Kubida

(57) ABSTRACT

The present invention includes an integrated circuit that can use a high-frequency timing reference generator from a high-speed serial interface to provide the clocking and timing requirements for the integrated circuit. The timing mechanism in the present invention obviates the need for phase locked loop (PLL) macrocells to provide timing reference and timing signals in the IC. The ICs of the present invention are preferably used as disk drive integrated circuits that include DSP, memory, data path controllers, data interfaces, custom macrocells, and DSP peripherals. The high-speed serial interface is preferably a Serial ATA (SATA), Universal Serial Bus (USB), Fiber Channel, or Serial Attached SCSI (SAS), among others. The present invention also includes a method of generating a timing reference signal in a IC that includes generating a high-frequency signal with the high-speed timing reference generator of a high-speed serial interface, then using a initial divider to generate a mid-frequency timing reference signal from the high-frequency timing reference signal, and then using a final divider to generate a final timing reference signal from the mid-frequency timing reference signal. In the present method, timing reference signals generated from a phase locked loop (PLL) macrocell are not required.

17 Claims, 4 Drawing Sheets

CLOCK GENERATOR FOR AN INTEGRATED CIRCUIT WITH A HIGH-SPEED SERIAL INTERFACE

BACKGROUND OF THE INVENTION

1. Field of the Invention

The present invention relates to an integrated circuit that includes a high-speed serial interface with clock generation capabilities. More particularly, the high-speed serial interface includes a high-frequency timing reference generator that can act as a timing source for the integrated circuit.

2. Relevant Background

Integrated circuits take functions that were previously provided by separate chips and integrate them into a single chip. The natural evolution of integrated circuits has lead to System On Chip ("SOC") circuits that integrate most system functions on a single IC chip. SOCs also typically include one or more internal timing references that provide clocking and timing information for the synchronous core logic and macrocells in the chip.

An example of an SOC in use today is a disk drive SOC that has a digital signal processor ("DSP"), memory, data path controller, data interface, macrocells, and DSP peripherals on a single IC chip. Disk drive SOCs commonly have a parallel data interface and typically include a quartz crystal or ceramic resonator incorporated into the feedback of an oscillator circuit to provide a stable frequency timing reference. The timing reference frequency of the stable frequency timing reference is usually low (e.g., 30 MHz) when compared with the high frequencies that are typical for the core logic and macrocells of the SOC (e.g., hundreds of megahertz or more). The high frequencies are typically generated by processing the signal from the stable frequency timing reference with Phase Locked Loop ("PLL") macrocells and programmable dividers.

PLLs typically multiply up the frequency of the lower frequency timing reference in a ratio that is defined by forward and feedback dividers (i.e., circuit logic). PLLs also typically include a phase detector, compensator, and Voltage Controlled Oscillator ("VCO") that are mixed-signal circuits. The high-frequency signals generated by PLLs are typically further manipulated by digital dividers and other circuit logic to produce signals with frequencies needed by the core logic and macrocells in an SOC.

The PLLs and programmable dividers, which are typically provided as a macrocell in a SOC, are optimized around the particular stable frequency timing reference used with the SOC. These mixed-signal macrocells have both analog and digital circuitry and therefore require both analog and digital design methods for implementation. Thus, development of these high-frequency, mixed-signal macrocells require more development time and resources than all digital circuits that designers can synthesize with high-level programming languages, and do have to know details of chip fabrication techniques.

Some recent SOCs designs substitute or complement a parallel data interface with a high-speed serial interface. The high-speed serial interface typically includes an oscillator to provide a stable frequency timing reference, and a dedicated high-quality, high-frequency timing reference generator that is dedicated for use in the serial interface macrocell circuitry. Unfortunately, because the high-frequency timing reference generator is only used by the serial interface, other SOC circuitry develop timing reference signals from the oscillator using mixed-signal circuitry in a substantially conventional manner. Hence, these high-speed serial interface SOCs also include PLLs and programmable dividers that require the designer to spend time and resources optimizing these and other components as well as implementing design changes. A need exists for systems and techniques that eliminate or simplify the requirements for mixed-signal timing reference generator circuitry and preferably leverage timing reference generation components already incorporated in the serial interface circuitry and macrocells.

SUMMARY OF THE INVENTION

The present invention includes an integrated circuit comprising a serial interface that includes a timing reference generator, an initial divider in electronic communication with the timing reference generator, and a final divider, fixed or programmable, in electronic communication with the initial divider.

The present invention also includes an integrated circuit comprising a serial ATA ("SATA") interface that includes a timing reference generator and an oscillator (wherein the oscillator is coupled to and in electronic communication with a quartz crystal stable frequency timing reference) an initial divider that is coupled to and in electronic communication with the timing reference generator, and a final divider that is coupled to and in electronic communication with the initial divider, wherein the final divider comprises a portion of the core logic of the integrated circuit (wherein said integrated circuit does not include a phase locked loop macrocell outside of the timing reference generator of the high-speed serial interface).

The present invention further includes a method of generating a timing reference signal in an integrated circuit comprising the steps of generating a high-frequency signal with a timing reference generator that is part of a serial interface within the integrated circuit, dividing the high-frequency signal with an initial divider to generate a mid-frequency timing reference signal, and dividing the mid-frequency timing reference signal with final dividers to generate final timing reference signals.

These and other features and advantages of the invention, as well as the structure and operations of various embodiments of the invention, are described in detail below with reference to the accompanying figures.

DETAILED DESCRIPTION OF THE PREFERRED EMBODIMENTS

Figure 1:
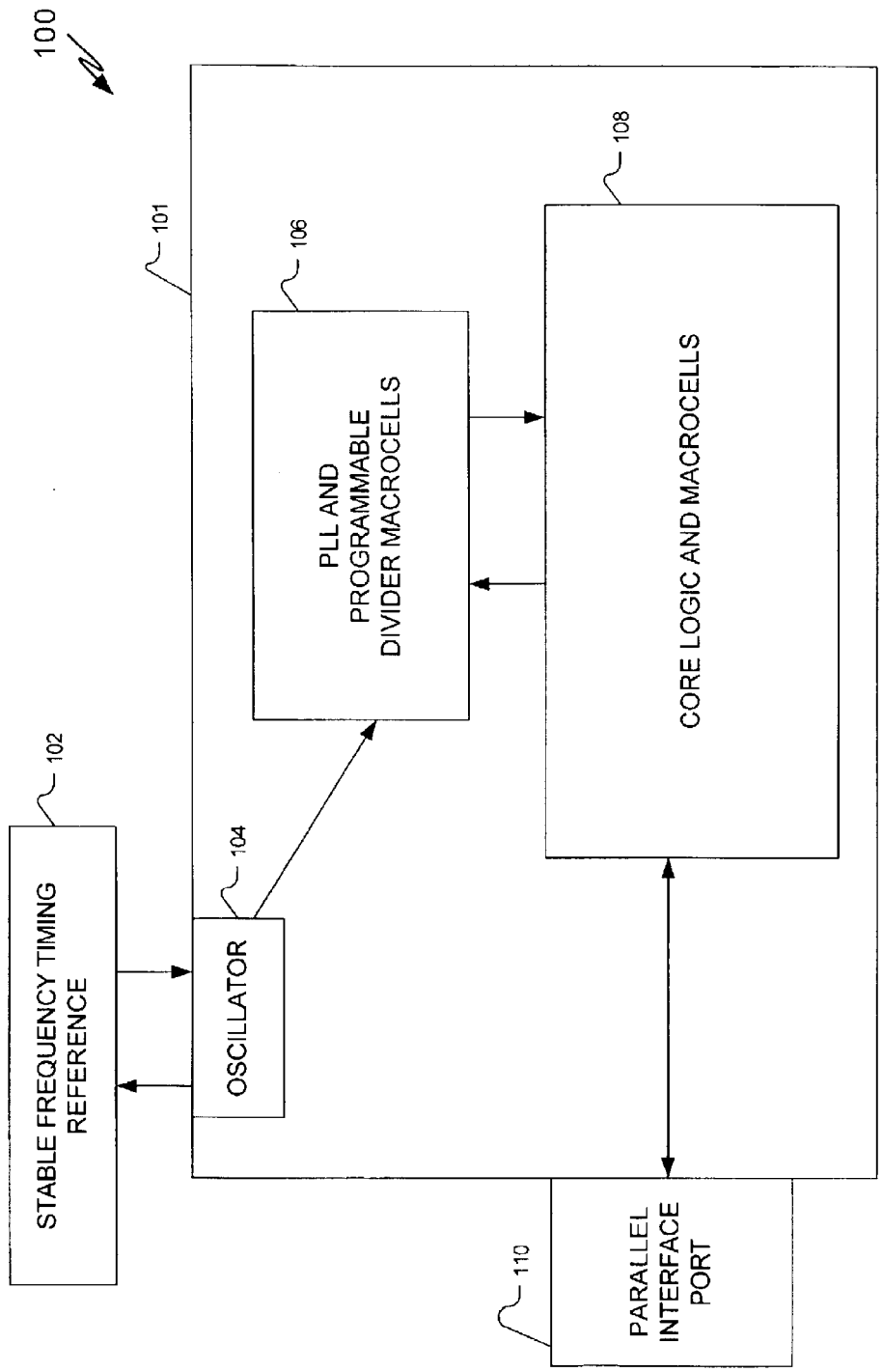
FIG. 1 shows a block-diagram for a parallel data interface IC integrated circuit that includes PLL and divider macrocells that are coupled to a low-frequency timing reference.

While the invention is susceptible to various modifications and alternative forms, specific embodiments thereof are shown by way of example in the drawings above, and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

FIG. 1, shows a block diagram of a prior art parallel data interface IC integrated circuit 100. In this diagram, the IC 101 is in electronic communication with low-frequency timing reference signals from an oscillator 104 coupled to a stable frequency timing reference 102. The stable frequency timing reference 102 is typically a quartz crystal or ceramic resonator that regulates the oscillator 104 which generates a low-frequency timing reference signal typically from about 1 MHz to about 50 MHz, more typically from about 20 MHz to about 40 MHz, and even more typically at about 30 MHz.

The low-frequency timing reference signal is coupled from oscillator 104 to one or more phase locked loops ("PLLs") and programmable divider macrocells 106 so that they can produce timing reference signals with frequencies that are usable by the core logic and macrocells 108 of the integrated circuit. The PLLs typically multiply up the frequency of the low-frequency timing reference signal in a ratio that is defined by forward and backward dividers (i.e., logic). The PLLs typically include a phase detector, compensator, and Voltage Controlled Oscillator (VCO) that are mixed-signal circuits.

The PLL and programmable divider macrocells 106 generate a fast timing reference signal that can be divided down with one or more digital dividers to produce slower timing reference signals that are useful to the core logic and macrocells 108 of the IC. The fast timing reference signals generated by the PLL and programmable divider macrocells 106 typically have frequencies from about 200 MHz to about 1000 MHz, and more typically at about 400 MHz. The slower timing reference signals typically have frequencies from about 50 MHz to about 200 MHz, or what ever particular frequency is needed by a portion of the core logic or a macrocell 108 of the IC 101. In this example, a parallel interface port 110 is shown so parallel interface signals are in electronic communication with the core logic and macrocells 108 of the IC 101.

Figure 2:
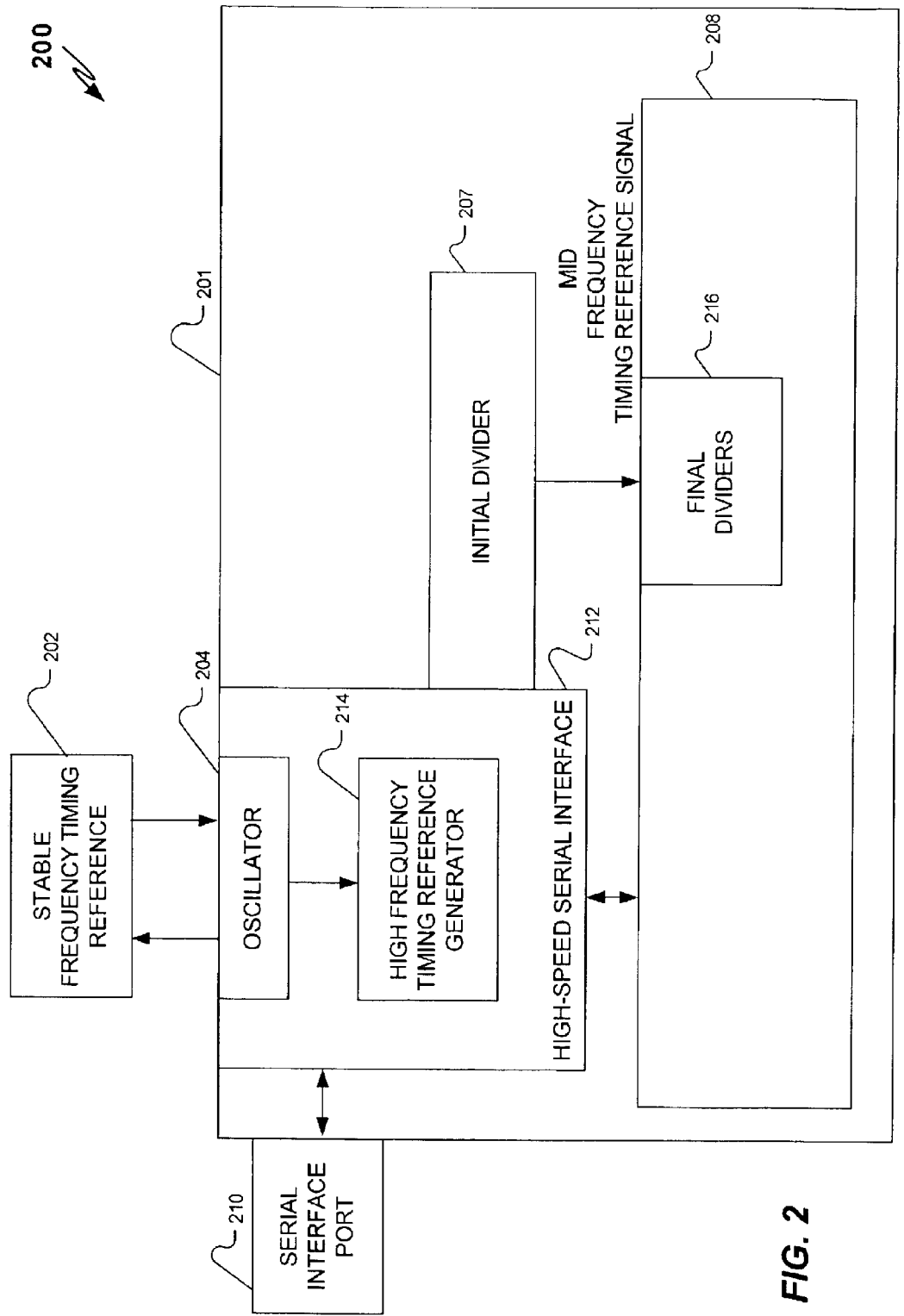
FIG. 2 shows a block-diagram for an example IC of the present invention that includes a serial interface with a high-frequency timing reference generator that is coupled to an initial divider, which, in turn is coupled to core logic final dividers in the IC.

FIG. 2 shows a block-diagram for an example of an integrated circuit 200, of the present invention, incorporating a high-speed serial interface. High-speed serial interface 212 typically uses high-frequency, low jitter, high-accuracy timing reference signals that are produced by high-frequency timing reference generators. The present invention utilizes these high-frequency timing reference signals to produce, using relatively inexpensive digital devices, timing reference signals for core logic 208 instead of separately generated timing reference signals from PLL macrocells as described for FIG. 1 above. Thus, the present invention obviates the need for PLL macrocells in the IC 201 integrated circuit.

In the example shown in FIG. 2, a stable frequency timing reference 202 coupled to an oscillator 204 that generates a low-frequency timing reference signal. The stable frequency timing reference 202 may be a quartz crystal or ceramic resonator and the oscillator 204 generates a low-frequency timing reference signal from about 1 MHz to about 50 MHz, or about 20 MHz to about 40 MHz, or about 30 MHz. The oscillator 204 may be located close to, or within the high-speed serial interface 212 of the IC 201.

The low-frequency signal is coupled to a high-frequency timing reference generator 214 that may be part of the high-speed serial interface 212. The high-frequency timing reference generator 214 generates one or more, typically three, low-jitter, high-accuracy signals that may have multiple phases, typically three phases, and have frequencies from about 1 GHz to about 5 GHz, and more typically at about 1.5 GHz. (Please note that 1 GHz=1×10$^9$ cycles/second).

The high-frequency timing reference generator 214 is coupled to an initial divider 207 that may process the high-frequency timing reference signals from the high-frequency timing reference generator 214 into mid-frequency timing reference signals. The mid-frequency timing reference signals may have frequencies from about 200 MHz to about 1000 MHz, or about 400 MHz to about 600 MHz. The initial divider 207 may be an all logic portion of the serial interface 212, which does not require mixed signal design techniques. Alternatively, the initial divider 207 may be separate and coupled to the high-frequency timing reference generator 214.

In an example of the present invention, the initial divider 207 may use divider ratios that are preselected for compatibility with the core logic 208 of the IC 201. For example, the divider ratios used in the initial divider 207 may be selected to generate mid-frequency timing reference signals that can be used without additional processing by the core logic 208, or by first processing the signals with final dividers 216 that form a portion of the core logic 208. It is contemplated that the final dividers 216 may use a fixed divider ratio or may use a programmable divider ratio.

As noted above, the high-frequency timing reference generator 214 of this example may not be dedicated to high-speed serial interface 212, but may also be available to generate timing reference signals used by IC 201. The high-speed serial interface 212 may be a high-speed serial interface of a type that includes Serial Advanced Technology Attachment ("SATA"), Universal Serial Bus ("USB"), Fibre Channel, and Serial Attached SCSI ("SAS"), among others.

Figure 3:
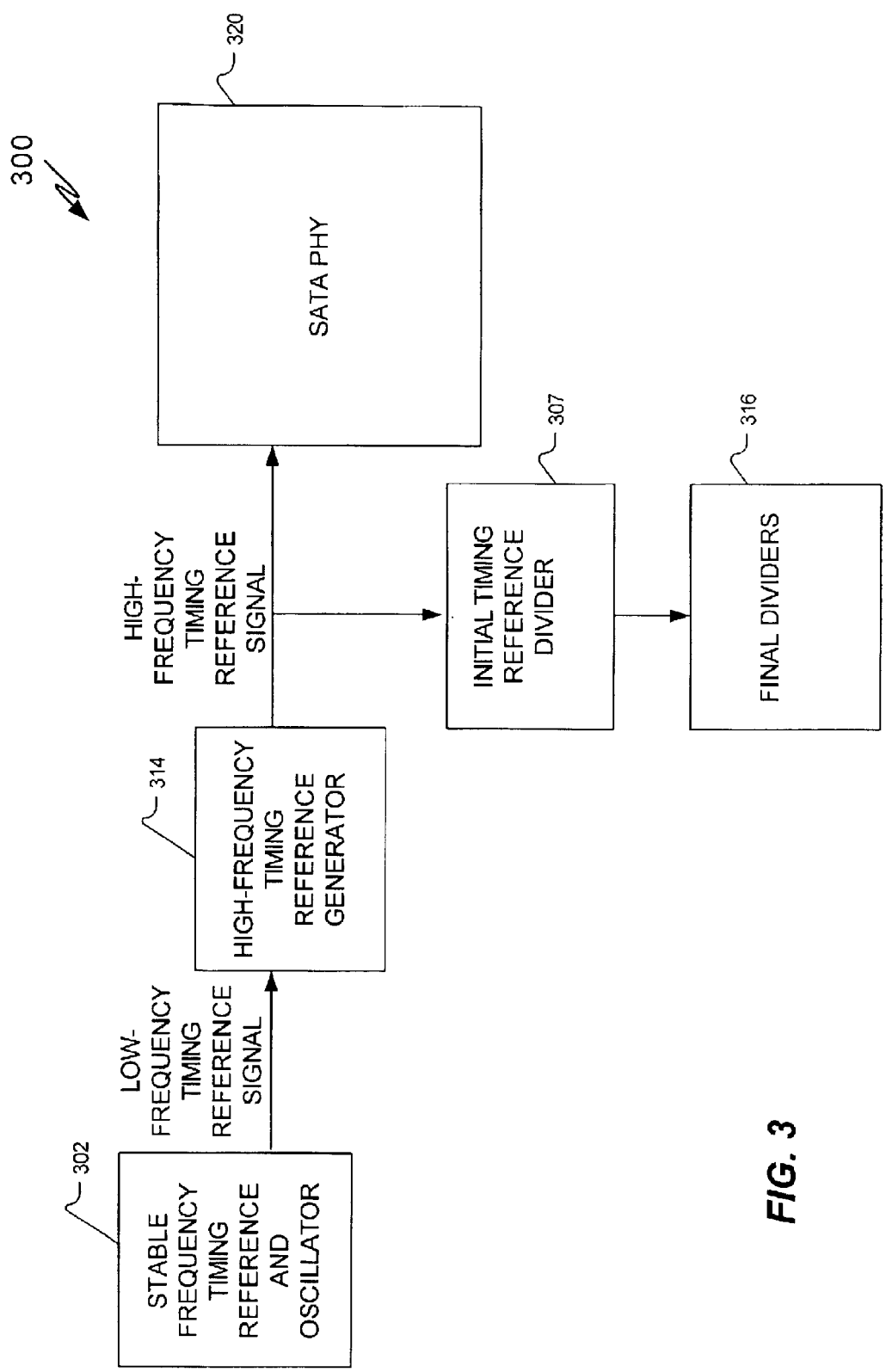
FIG. 3 shows a block-diagram of an example timing reference structure in an IC of the present invention.

FIG. 3 shows an example of a block-diagram of timing reference signal processing in an IC of the present invention. In this example, a stable frequency timing reference 302, that may be a quartz crystal timing reference or ceramic resonator coupled to an oscillator, may be coupled to a high-frequency timing reference generator 314. The stable frequency timing reference 302 may generate a low-frequency timing reference signal from about 1 MHz to about 50 MHz, or about 20 MHz to about 40 MHz, or about 30 MHz. The high-frequency timing reference generator 314 may be part of the high-speed serial interface physical layer ("SATA PHY") 320 and may use the low-frequency timing reference signal from the stable frequency timing reference 302 to generate one or more, typically three, low-jitter, high-accuracy, high-frequency timing reference signals that may have multiple phases, typically three phases. The high-frequency timing reference signals may have a frequency from about 1 GHz to about 5 GHz, and more typically about 1.5 GHz.

The high-frequency timing reference generator 314 may be coupled to initial timing reference divider 307. The initial timing reference divider 307 may be a macrocell in the physical layer of the serial high-speed interface. The initial reference divider 307 may also be coupled to a portion of the core logic of the IC that provides register-based commands to the initial timing reference divider 307. Examples of register-based commands may include a control of the divider ratio that controls the frequencies of timing reference signals output from the initial timing reference divider 307.

The timing reference signals generated by initial timing reference divider 307 may be coupled to final dividers 316. The final dividers 316 may be part of the core logic of the IC and may process the timing reference signals from initial timing reference divider 307 to provide final timing reference signals for the components of the core logic of the IC. Integrating the final dividers 316 into the core logic of the IC eliminates the need for separate PLL macrocells. This allows the final dividers to be synthesized in the standard core logic which eliminates the need for the custom dividers in a PLL macrocell. The final dividers 316 may use a fixed divider ratio or may use a programmable divider ratio.

Figure 4:
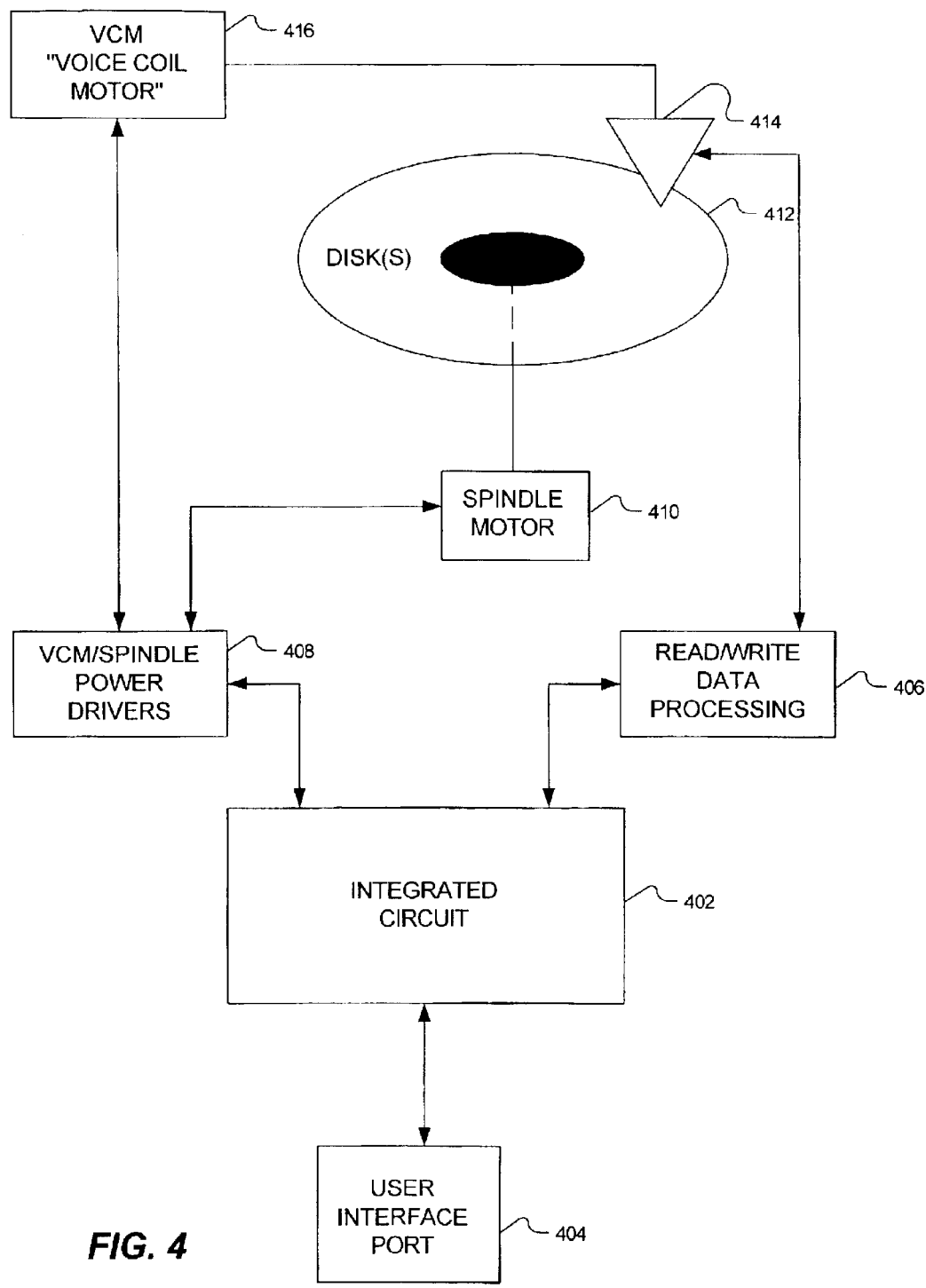
FIG. 4 shows a block-diagram of an example application of a disk drive IC with a high-speed serial data interface according to the present invention.

The IC of the present invention is contemplated to work with many types of systems and devices including storage systems and disk storage devices that include high-speed serial data interfaces (e.g., SATA, FC, and SAS). FIG. 4 shows a block-diagram of an example disk drive application 400 with a high-speed serial data interface according to the present invention. IC 402 includes core logic for sending and receiving commands and data between a user interface and disk drive via a high-speed serial user interface port.

IC 402 may be coupled to user interface 404 and disk drive circuitry such as read/write data processing circuitry 406 and Voice Coil Motor ("VCM")/Spindle power driver circuitry 408. The read/write data processing circuitry typically comprises a preamp and a read channel (not shown). The preamp and read channel may be located external to the integrated circuit, or may be incorporated into the integrated circuit. Read/write data processing circuitry 406 may be coupled to read/write head circuitry 414 that reads and writes binary data to data disk 412. VCM/Spindle power driver circuitry 408 may be coupled to spindle motor 410 that actuates the rotation of data disk 412 and may also be coupled to VCM circuitry 416 that controls the actuation of read/write head 414 across data disk 412.

Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention, as hereinafter claimed.

I claim:

1. An integrated circuit comprising:
    a serial interface that includes a timing reference generator;
    an initial divider in electronic communication with the timing reference generator; and
    a final divider in electronic communication with the initial divider wherein said integrated circuit does not include a phase locked loop macrocell outside the timing reference generator.

2. The integrated circuit of claim 1, wherein the final divider comprises a portion of the core logic of the integrated circuit.

3. The integrated circuit of claim 1, wherein the serial interface is selected from the group consisting of USB, SAS, Fibre Channel, and Serial ATA (SATA).

4. An integrated circuit comprising
    a serial interface that includes a timing reference generator;
    an initial divider in electronic communication with the timing reference generator; and
    a final divider in electronic communication with the initial divider, wherein the serial interface is a serial ATA (SATA) interface comprising an SATA PHY macrocell.

5. The integrated circuit of claim 1, wherein the serial interface comprises an oscillator.

6. The integrated circuit of claim 1, wherein the integrated circuit is coupled to a stable frequency timing reference.

7. The integrated circuit of claim 1, wherein the stable frequency timing reference comprises a quartz crystal.

8. The integrated circuit of claim 1, wherein the stable frequency timing reference comprises a ceramic resonator.

9. The integrated circuit of claim 1, wherein the integrated circuit is a disk drive IC comprising:
    a user interface port coupled to the IC; and
    disk drive circuitry coupled to the IC, wherein said disk drive circuitry includes VCM/Spindle power driver circuitry that controls mechanical actuation of a hard disk and read/write heads, and read/write data processing circuitry.

10. An integrated circuit comprising:
    a serial ATA (SATA) interface port that includes a timing reference generator and an oscillator, wherein the oscillator is coupled to a quartz crystal stable frequency timing reference;
    an initial divider coupled to the timing reference generator; and
    a final divider coupled to the initial divider, wherein the final divider comprises a portion of the core logic of the integrated circuit, and
    wherein said integrated circuit does not include a phase locked loop macrocell outside the timing reference generator.

11. A method of generating a timing reference signal in integrated circuit comprising the steps of:
    generating a high-frequency signal with a timing reference generator that is part of a serial interface within the integrated circuit;
    dividing the high-frequency signal with an initial divider to generate a mid-frequency timing reference signal; and
    dividing the mid-frequency timing reference signal with a final divider to generate a final timing reference signal, wherein said method does not comprise the step of generating a timing reference signal with a phase locked loop macrocell outside the timing reference generator.

12. The method of claim 11 comprising the steps of:
    generating a low frequency timing reference signal with a stable frequency timing reference that is in electronic communication with the serial interface.

13. The method of claim 12, wherein the low-frequency timing reference signal has a frequency of about 30 MHz.

14. The method of claim 11, wherein the high-frequency signal has a frequency of about 1.5 GHz.

15. The method of claim 11, wherein the mid-frequency timing reference signal has a frequency from about 200 MHz to about 1000 MHz.

16. The method of claim 11, wherein the mid-frequency timing reference signal has a frequency from about 400 MHz to about 600 MHz.

17. The method of claim 11, wherein the final timing reference signal has a frequency from about 40 MHz to about 200 MHz.

* * * * *